(12) United States Patent
Eigler et al.

(10) Patent No.: US 8,266,624 B2
(45) Date of Patent: Sep. 11, 2012

(54) TASK DISPATCH UTILITY COORDINATING THE EXECUTION OF TASKS ON DIFFERENT COMPUTERS

(75) Inventors: Frank Ch. Eigler, Brantford (CA); Brendan L. Conoboy, Albuquerque, NM (US)

(73) Assignee: Red Hat, Inc., Raleigh, NC (US)

( * ) Notice: Subject to any disclaimer, the term of this patent is extended or adjusted under 35 U.S.C. 154(b) by 1241 days.

(21) Appl. No.: 11/607,558

(22) Filed: Nov. 30, 2006

(65) Prior Publication Data

US 2008/0256544 A1    Oct. 16, 2008

(51) Int. Cl.
G06F 9/46 (2006.01)
G06F 11/00 (2006.01)
G06F 9/44 (2006.01)
G06F 15/16 (2006.01)

(52) U.S. Cl. ........ 718/103; 718/104; 709/201; 717/124; 717/126; 714/37; 714/38.1

(58) Field of Classification Search .......... 718/100, 718/101, 102, 104; 717/124; 714/33, 37
See application file for complete search history.

(56) References Cited

U.S. PATENT DOCUMENTS

| | | | | |
|---|---|---|---|---|
| 6,098,091 A * | 8/2000 | Kisor | ........................... | 709/202 |
| 6,148,322 A * | 11/2000 | Sand et al. | .................... | 718/103 |
| 6,567,840 B1 * | 5/2003 | Binns et al. | .................. | 718/103 |
| 6,829,764 B1 * | 12/2004 | Cohen et al. | .................. | 718/103 |
| 7,197,749 B2 * | 3/2007 | Thornton et al. | ............. | 718/101 |
| 7,243,352 B2 * | 7/2007 | Mandava et al. | ............. | 718/104 |
| 7,373,636 B2 * | 5/2008 | Barry et al. | ................... | 717/124 |
| 7,386,763 B2 * | 6/2008 | Sathe | .............. | 714/43 |
| 7,426,729 B2 * | 9/2008 | Avvari et al. | .................. | 718/104 |
| 7,490,269 B2 * | 2/2009 | Klamik | ....................... | 714/47.2 |
| 7,565,657 B1 * | 7/2009 | Leung et al. | .................. | 718/104 |
| 7,568,183 B1 * | 7/2009 | Hardy et al. | .................. | 717/121 |
| 2003/0014510 A1 * | 1/2003 | Avvari et al. | .................. | 709/223 |
| 2003/0229825 A1 * | 12/2003 | Barry et al. | ...................... | 714/38 |
| 2004/0010539 A1 * | 1/2004 | Archbold | ....................... | 709/201 |
| 2004/0019890 A1 * | 1/2004 | Verbeke et al. | ............... | 718/100 |
| 2005/0022194 A1 * | 1/2005 | Weir et al. | ..................... | 718/100 |
| 2005/0034126 A1 * | 2/2005 | Moore | .......................... | 718/100 |
| 2005/0198628 A1 * | 9/2005 | Graham et al. | ............... | 717/174 |
| 2006/0080638 A1 * | 4/2006 | Fiore | .............................. | 717/104 |
| 2006/0271830 A1 * | 11/2006 | Kwong et al. | .................. | 714/50 |

* cited by examiner

*Primary Examiner* — Jennifer To
(74) *Attorney, Agent, or Firm* — Lowenstein Sandler PC (57) ABSTRACT

Computer resource management techniques involving receiving notification of an available resource, generating a set of tasks that could be performed by the resource, and dispatching one of the tasks on the resource. Related systems and software are also discussed. Some techniques can be used for automatic software building and testing.

16 Claims, 6 Drawing Sheets

TASK DISPATCH UTILITY COORDINATING THE EXECUTION OF TASKS ON DIFFERENT COMPUTERS

FIELD

The invention relates to computer operations scheduling. More specifically, the invention relates to automated procedures for software building, testing and related activities.

BACKGROUND

Development of large software systems is a complex undertaking. In addition to coordinating the activities of a number of programmers (who may be working on different but overlapping or interacting subsystems), automatic development support tools may be called upon to extract more useful work from available computing resources and to guard against errors.

Current systems can be configured to automatically perform non-interactive ("batch") tasks on a set schedule (for example, at a predetermined time). However, tying batch jobs to real-world (or "wall clock") time can result in unexpected and irreproducible system operations when transient events such as excess processing demand or system outages cause batch jobs to take longer than normal or to begin after their scheduled times.

Methods of improving a computing environment's resource utilization efficiency, throughput, determinism and reproducibility may be of value.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

FIG. 4 outlines a method of processing test results.

DETAILED DESCRIPTION

Embodiments of the invention coordinate the operations of computer systems, which usually interact by communicating over a distributed data network such as the Internet. Non-interactive ("batch") processing jobs are maintained and distributed for execution as processing resources become available. Job dispatching may be based on minimum and/or maximum latencies, periodicities, and other triggers that are not necessarily connected with real ("wall clock") time.

Figure 1:
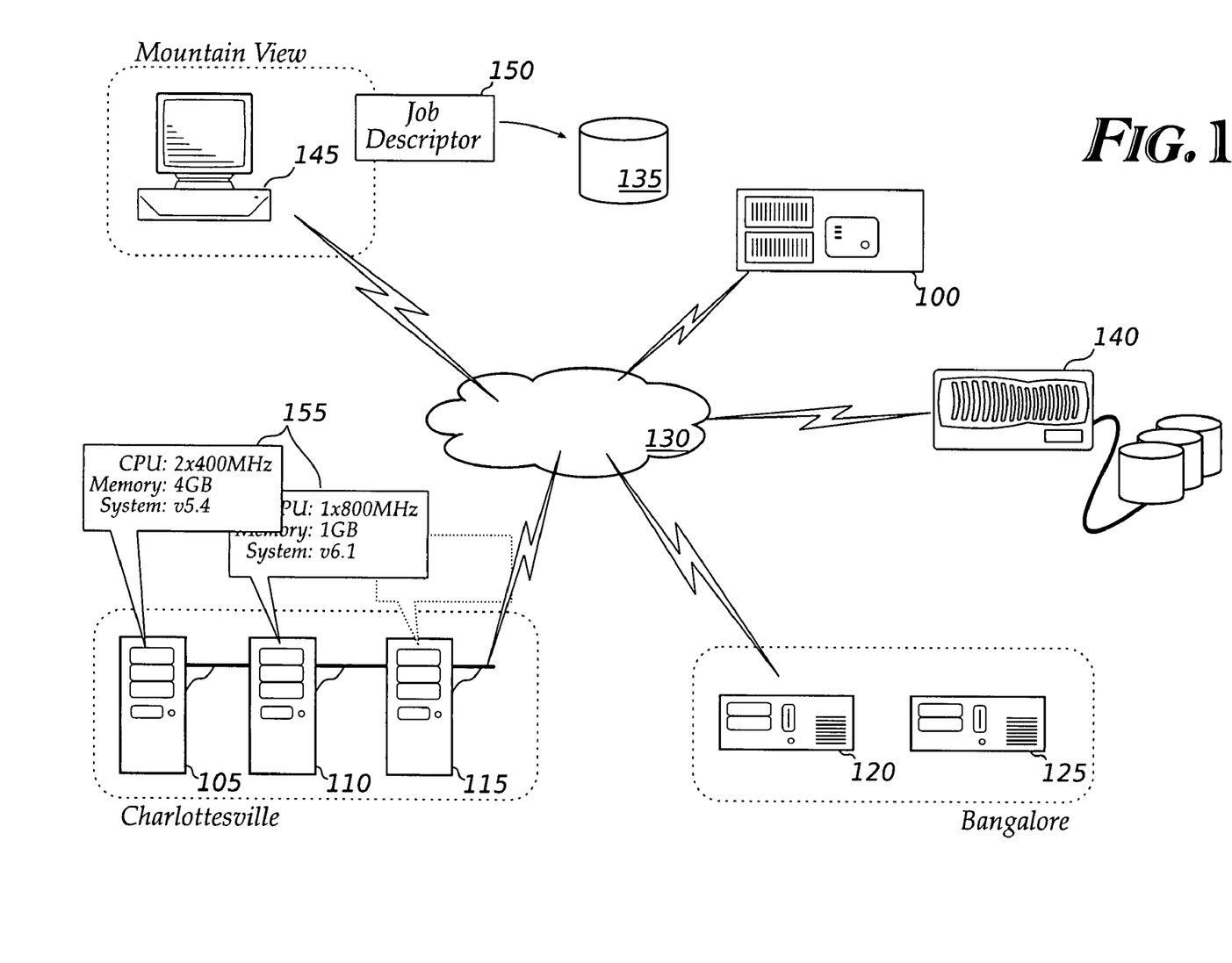
FIG. 1 shows a sample environment where embodiments of the invention may be deployed.

FIG. 1 shows a sample environment where an embodiment of the invention operates. This sample environment is both geographically and logically distributed. Embodiments are particularly useful in distributed environments, but find application in single-site and even single-machine installations as well.

Computer system 100 operates as a task dispatcher, receiving notifications of computing resource availability from systems such as 105, 110, 115, 120 and 125, which may be located in different geographic locations, as shown. Systems communicate with each other via a distributed data network 130 such as the Internet. Task database 135 may be co-located with the dispatcher's system or operated by a remote server (not shown). A storage server 140 may provide data storage for the various systems so that the systems can access a common set of files and directories.

A software developer (not shown), working at system 145, may create or modify the source code of an application. This source code may be stored on storage server 140. When the developer is satisfied with his ad-hoc testing, he may enter a job 150 into the task database 135 so that a complete set of tests will be performed. Alternatively, if the developer is working on an existing application, one or more building or testing jobs may have already been entered into the task database 135.

Then, according to methods described in greater detail below, a computer system such as 105-125 notifies dispatcher 100 that it is available to perform a task. The notification may include information 155 such as a description of the architecture, speed and number of processors of the system, the amount of system memory installed, the versions of its operating system, development tools and other software, and so on. Dispatcher 100 refers to task database 135 to generate a set of tasks that could be performed by the system and dispatches one of those tasks. Results of the task may be collected and returned to the developer, stored for future reference, or otherwise disposed of.

A distinctive feature of the system described above is its flexibility. Tasks are identified for execution when an appropriate computer resource becomes available, rather than being placed on a fixed schedule and started at a predetermined time regardless of whether the executing system is already busy. Thus, resources may be allocated more efficiently. When many machines are available to execute tasks, many tasks can be performed. If systems are busier than normal, or if they are taken out of service for repairs or upgrades, fewer tasks are performed, but no backlog of scheduled tasks is created, and tasks are not placed in competition with each other for system resources (e.g. memory and processor cycles). In this respect, the overall system has improved deterministic characteristics that can be understood by analogy to a battery-powered analog clock. If the battery is removed, the clock stops, but there is no question what will happen when the battery is replaced. The clock may no longer show the correct time, but time intervals measured using the clock will be correct (as long as the interval did not start before the clock was stopped, and end afterwards).

Figure 2:
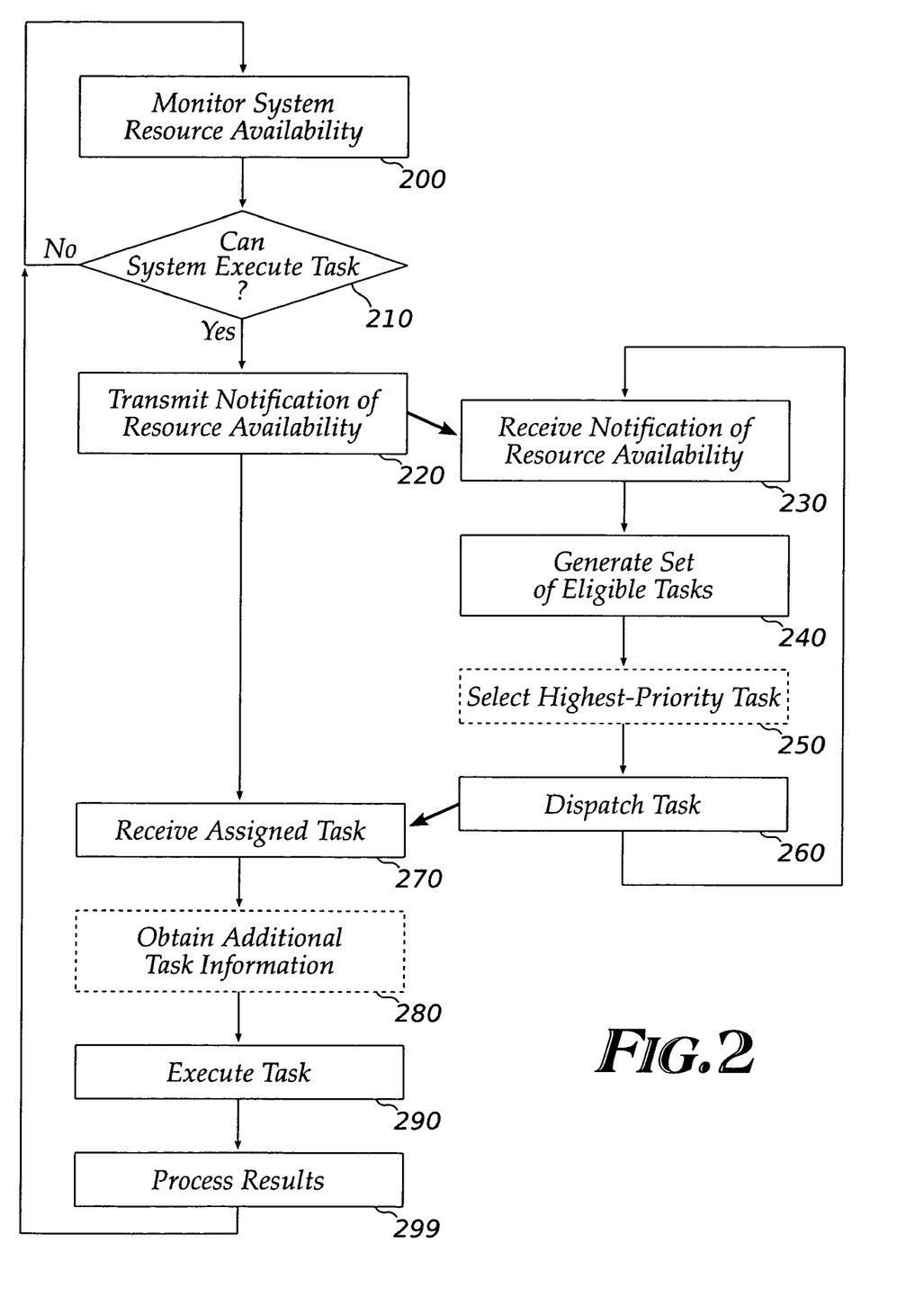
FIG. 2 outlines a method according to an embodiment of the invention.

FIG. 2 outlines a method implemented by the computers participating in an embodiment of the invention. Operations are attributed to logical entities, not to individual computers. A system hosting software that performs the task selection and dispatch functions may also operate as a task worker, offering some of its computing resources to the dispatcher.

Software on a resource-providing system (hereinafter "worker" or "worker process") contains logic to monitor its own system's resource availability (200). For example, the worker may monitor the system's overall idle ratio, its memory utilization, the number of processes executing, whether any interactive (user) sessions are in progress, etc. In some embodiments, the worker may rely on underlying system resource scheduling algorithms rather than monitoring availability itself. In such embodiments, the worker always considers resources to be available if it is not currently executing a task. The number of worker processes may be controlled to prevent overwhelming system resources in this case. For example, one worker process per central processing unit ("CPU") may be started, and each worker operated to execute exactly one task to completion before announcing the system's availability to perform another task.

If, as a result of any of these sorts of resource monitoring, the system is determined to be able to execute a task (210), the worker transmits a notification of resource availability to a job dispatcher (220). The notification may include information such as the architecture of the machine, the number of processors and amount of memory, system and software version identifiers and so on.

The job dispatcher receives the notification of resource availability (230) and refers to a database of tasks to generate a set of tasks that could be performed by the resource (240). For example, some tasks may specify that they are to be executed only on a particular type of processor, only on a system with more than one physical CPU, only on a system with a specific version of system software, only on a system with a particular network configuration, or only on a system in a certain time zone. Eligible tasks may be located in the task database by executing a query constructed using information in the worker's notification.

Distinctions of arbitrary granularity may be supported by some embodiments, limited only by the detail reported by the worker's notice of availability. For instance, although some CPUs manufactured by the Intel Corporation and some CPUs manufactured by the AMD Corporation implement a largely compatible instruction set, certain tasks may depend on differences between the CPUs in a way that makes results generated by one processor useless for comparison to results generated by another processor. Such a task might be eligible for execution only on a system with one type of CPU. In some embodiments, tasks in the database may even be limited to execution by one specific machine, identified by name, Internet Protocol ("IP") address, or other means.

If the job dispatcher identifies several tasks, any of which could be executed by the available resource, a priority ranking algorithm may be used to sort the tasks so that the highest-priority of the tasks can be selected (250). Alternatively, one of the tasks could be selected at random, or based on historical or other information. For example, if historical data about the task is available, then a task that (historically) completes in the shortest amount of time, or using the smallest amount of resources, may be selected. In some embodiments, the job dispatcher may include logic to steer tasks to the same machine that was previously used for the same task. This can help prevent difficult-to-trace artifacts where two apparently-identical worker systems produce inconsistent results due to environmental factors that are not apparent from the information in the notification of resource availability.

Once an eligible task has been identified and selected, the job dispatcher sends the task to the worker (260). The task may be sent as an identifier that the worker can use to retrieve related information from the task database, as a package of instructions and data that the worker can process directly, or as a combination of reference information and directly-processable information.

The worker receives its assigned task (270) and may retrieve additional information from databases or shared data storage (280). The task is executed by the worker's system (290), using some of the computing resources earlier announced to be available. The task may produce results such as data files, printouts, or warning/error messages. These results may be collected and processed by the worker process (299) according to directions associated with the task. For example, output may be stored in a log file for subsequent review, entered into a database for comparison with other results of the same (or a different) task, or sent to an administrator via electronic mail. Warning and error messages from a failed task execution may be collected and processed differently.

Some tasks may have the effect of altering the worker system's environment or configuration. The worker process may be responsible for identifying these changes and reporting them as a result. Alternatively, the task itself may include instructions and data to identify and report such changes. Some embodiments may include logic to restore the worker system to a predetermined state, so that a subsequent execution of the same task will start from the same initial configuration and can be expected to produce the same results.

while a task is executing, the worker logic may monitor it for excessive resource utilization. A runaway task that consumes more memory, disk space, processing cycles, or wall-clock time than expected can be terminated.

Identification of eligible tasks, as shown in FIG. 2 at 240, occurs when computing resources are known to be available. In addition to the system, software-version, and environment-related criteria discussed above for selecting tasks, the task dispatcher may consider period- or interval-dependent time data. (Recall that, according to embodiments of the invention, tasks are not scheduled for execution at a particular absolute or wall clock time.) Thus, for example, a task may be limited to being run no sooner than two hours after a previous run, or no more than once in any week. A system can also approximate maximum-delay-before-execution functionality by increasing the priority of a task that has not been run in some time. For instance, a once-a-day task could have both an "at least twenty hours since last execution" limitation and an increasing priority beginning at twenty hours, so that the task becomes more and more likely to be selected for execution about twenty four hours after a previous execution.

Task periodicity can also be dynamically computed based on the result of a previous execution of the same (or another) task. For example, a software testing task may be configured to be eligible to run approximately every three days, but if the test fails, the task may become eligible for re-execution after only three hours. This operational mode helps ensure that fresh test results are available to a developer working on the software, without needlessly consuming computing resources by performing frequent when the software is not being modified. A task may become eligible for execution only after another task is successfully executed. For example, a software testing task may depend on a previous successful build task.

Figure 3:
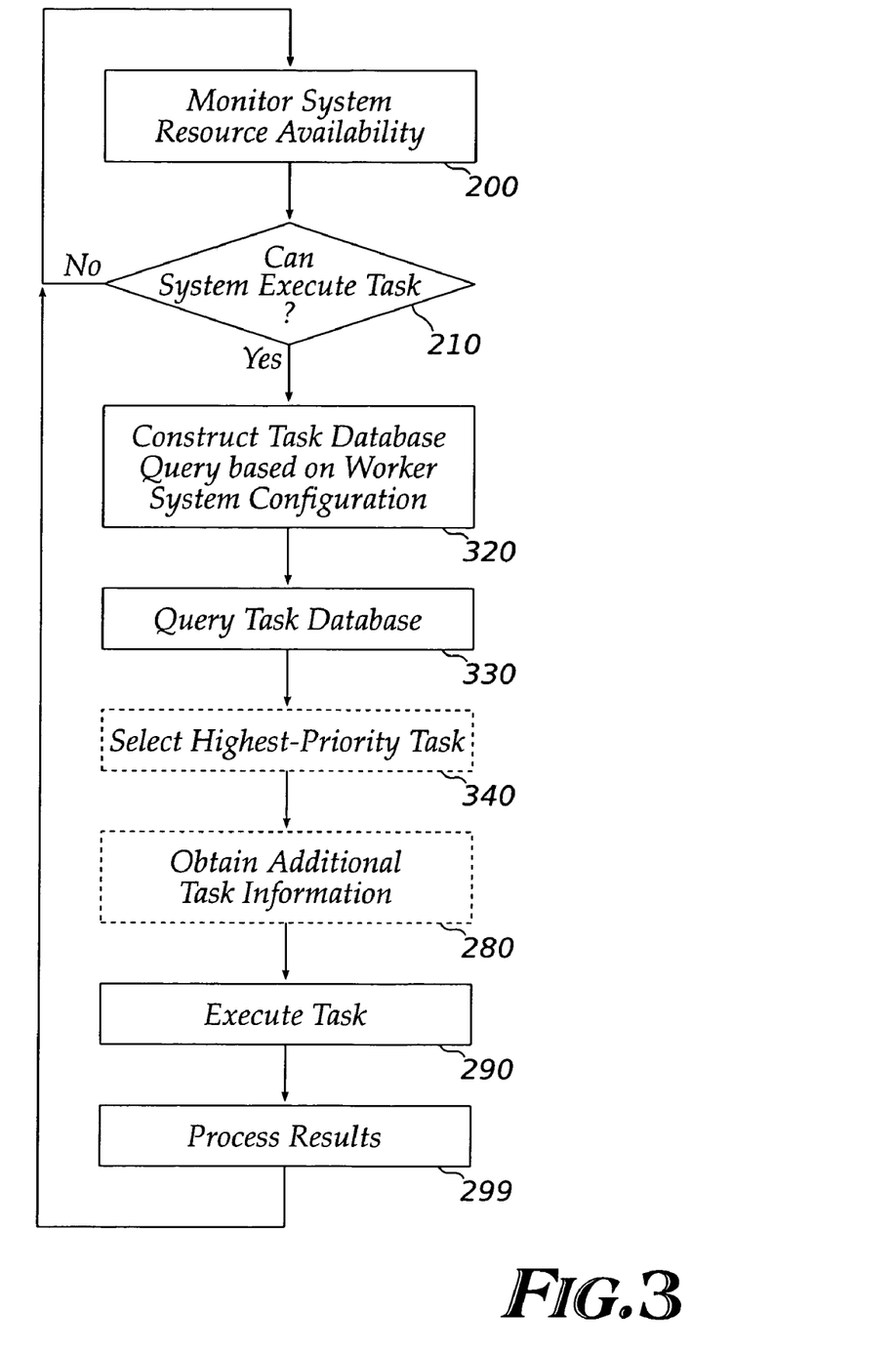
FIG. 3 outlines an alternate method according to an embodiment of the invention.

The preceding discussion presumed a clear demarcation between server (task dispatcher) and client (worker process) functionality. However, in the distributed environments where embodiments often operate, information in the task database may be accessible directly to the worker systems, so no separate task dispatcher may be required. FIG. 3 outlines an alternative embodiment where the worker process selects a task for itself when it has computing resources to offer, without involving a central task dispatcher.

As in the previously-described embodiment, logic in the worker process monitors its system resource availability (200). If the system can execute a task (210), the worker constructs a task database query based on its system configuration (320). The query may incorporate the type and number of processors, system software versions, and other system information. The query may also contain clauses that limit the records returned to tasks that are eligible to be run at the present time, or logic built into the database itself may perform this limitation. (For example, a Structured Query Language ("SQL") database may define a view that contains all tasks that could presently be executed on any possible system, and the worker's query could select those records that are appropriate for the worker's system configuration.)

This query is executed against the task database (330) to generate a set of tasks that could be executed by the worker's system. If more than one task is in this set, the worker selects the highest-priority of the tasks (340), obtains any additional information necessary to perform the task (280), and executes the task (290), monitoring the task's execution and processing results (299) as before.

This embodiment may be preferred when worker systems have direct access to the task database and do not require assistance from a central server to decide what task should benefit from the worker's available resources.

Embodiments of the invention are useful in software programming scenarios where an application under development is to be periodically compiled and tested under various system environments to help ensure that modifications to the application do not inadvertently cause errors under some combination of system hardware and software. FIG. 4 outlines a method of processing test results that can help prevent software regressions (changes to add new functionality or fix an error that accidentally cause other errors to appear).

A testing task (perhaps dispatched by the job dispatcher described above) executes an application that is to be tested (410). The application's functionality is exercised (420) by providing predetermined input data and monitoring the application's response. Test results are collected (430) and compared to a baseline set of results (440). Results may conveniently be stored as a vector or array of "pass/fail" indications, although the underlying test may measure a continuous process. For example, a test may measure the amount of time the application requires to perform a predetermined calculation. Such a test may be deemed "passed" if the application completes the calculation in less than a maximum amount of time, and "failed" otherwise.

Figure 5:
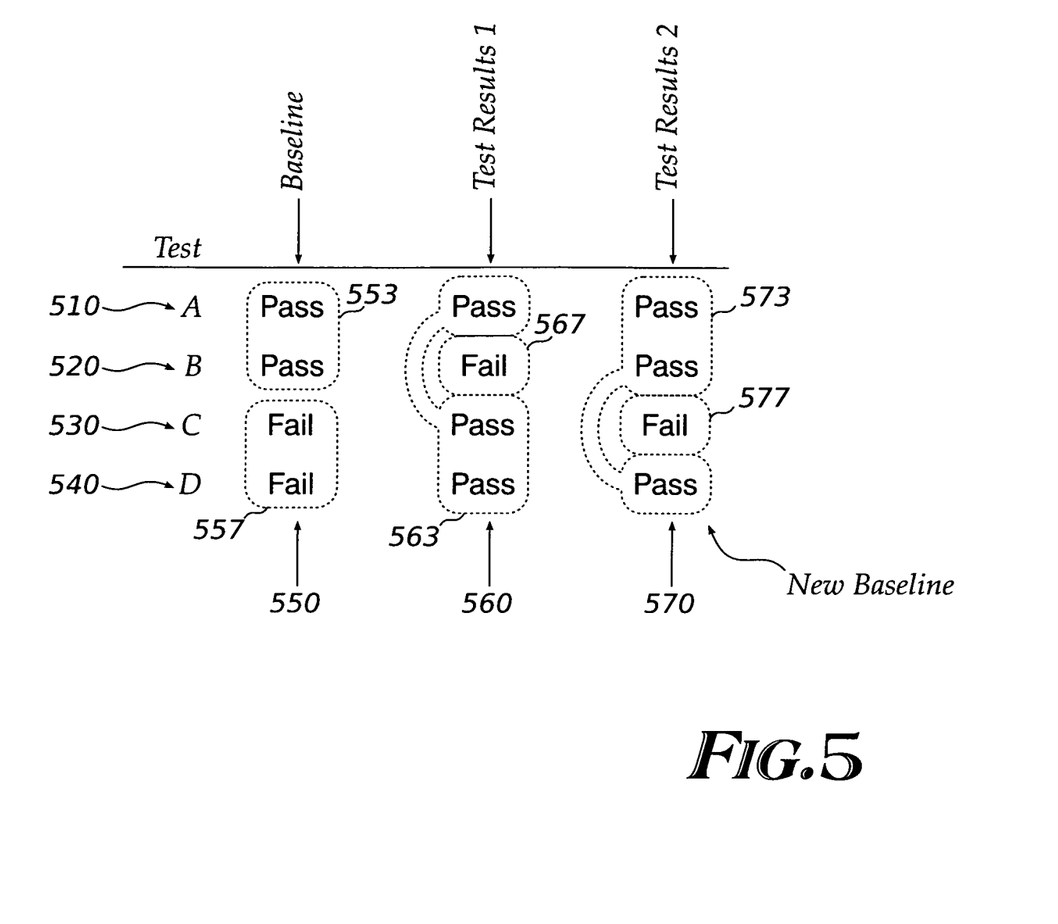
FIG. 5 is a concrete example of test result processing.

If the current test results are better than the baseline results (450), the baseline is automatically updated with the current test results (460). This is in contrast to traditional testing methods, where an engineer or committee reviews a series of test results to decide when the results are sufficiently superior to the current baseline to warrant designation as a new baseline. To support automatic determination of "better" test results, it is important to have a clear criterion for deciding that a set of results is better. According to embodiments of the invention, this criterion is that no individual test that passed in the baseline, failed in the current test. FIG. 5 shows this criterion in a table form.

For this (simple) application, four tests are defined: A 510, B 520, C 530 and D 540. Before a development cycle, the baseline 550 state of the application is that tests A 510 and B 520 pass (53), while tests C 530 and D 540 fail (557). After some work, a testing task collects results 560 showing that tests A, C and D pass (563), but test B no longer passes (567). Therefore, results 560 are not considered "better" and the baseline is not automatically updated. After more work, results 570 show that tests A, B and D pass (573), although C has reverted to failure (577). These results 570 are better than the baseline 550 because test D has passed, and no test that passed in the baseline fails in the current results (although test C passed in results 460, those results were not "better" and were not instated as a new baseline). Test results 570 are automatically designated as a new baseline, against which subsequent test results are compared.

Figure 6:
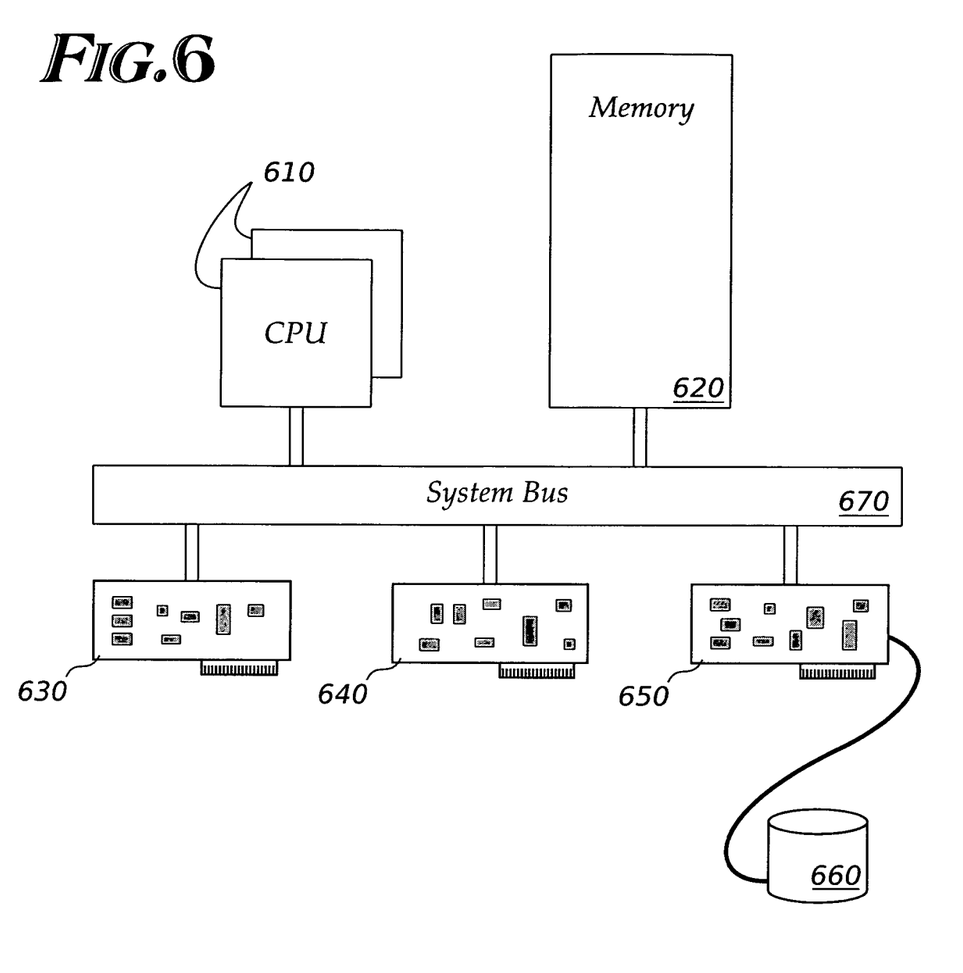
FIG. 6 shows some subsystems of a computer for use with an embodiment of the invention.

FIG. 6 shows some subsystems of a general-purpose computer that can be used with an embodiment of the invention. This computer has two central processing units ("CPUs") 610, which are programmable processors for executing instructions stored in memory 620 to perform methods as described above. Embodiments can also operate on systems with only one CPU, or with more than two CPUs. The system shown here has several hardware interfaces: a network interface 630 for communicating and exchanging data with other systems participating in an embodiment, and a mass storage device 650 for storing data on a local hard disk 660. This system also has a special hardware device 640 (such as an enhanced graphics adapter, a cryptographic processor, or an audio interface) that may be reported to a task manager in connection with a notification of resource availability, so that tasks that require the special hardware can be selected for execution by the system.

An embodiment of the invention may be a machine-readable medium having stored thereon instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that a stateless task dispatch utility can also be implemented by software and hardware that distribute the functions of embodiments of this invention differently than herein described. Such variations and implementations are understood to be captured according to the following claims.

We claim:

1. A method comprising:
    receiving, by a dispatching computer system, a notification of an available computer resource, the notification identifying one or more hardware characteristics of the available computer resource, the notification being generated when a worker process running on the available computer resource determines that the available computer resource is able to execute a task;
    upon receiving the notification of the available computer resource, accessing a data store of a plurality of tasks requiring specific hardware characteristics;
    generating, from the plurality of tasks, a set of tasks eligible to be performed by the available computer resource based on matching hardware characteristics;
    selecting a highest priority task from the set of eligible tasks;
    dispatching the highest priority task to the available computer resource for execution, the highest priority task testing a software package on a predetermined system architecture under a predetermined version;
    monitoring an execution of the highest priority task;
    comparing a result of the highest priority task during the execution against a current predefined outcome;
    setting the result of the highest priority task as a new predefined outcome if the result of the highest priority task supersedes the current predefined outcome; and
    terminating the highest priority task if the highest priority task exceeds an execution limit, the execution limit comprising at least one of a memory limit, a disk limit, a central processor unit ("CPU") time limit, or a wall-clock time limit.

2. The method of claim 1 wherein generating comprises:
    selecting the set of tasks from a group of potential tasks based on a periodicity of the potential tasks.

3. The method of claim 1 wherein generating comprises:
    constructing a database query based on the notification; and
    executing the database query to retrieve data records describing the set of tasks.

4. The method of claim 1 wherein the notification identifies an architecture of the computer resource and a system version of the computer resource.

5. The method of claim 4 wherein generating comprises:
    selecting the set of tasks from a group of potential tasks based on a required architecture or system version of the potential tasks.

6. The method of claim 1, wherein dispatching the highest priority task to the available computer resource comprises:
    if the set of tasks contains more than one task, sorting the set of tasks; and
    identifying the highest-priority task of the set of tasks for dispatching.

7. The method of claim 1, further comprising:
    adjusting an eligibility of the highest priority task for a future execution based on a result of the dispatching operation.

8. A non-transitory computer-readable medium containing instructions to cause a programmable processor to perform operations comprising:
    determining, by a dispatching computer system, if processing resources are available using worker processes running on processing resources to detect when a processing resource is able to execute a task;
    determining hardware characteristics of the available processing resources;
    upon identifying the available processing resources, querying a task database of a plurality of tasks requiring specific hardware characteristics to find tasks eligible to be performed by the available processing resources based on matching hardware characteristics;
    selecting a highest priority task from the found eligible tasks;
    causing the highest priority task to be executed by the available processing resources, the highest priority task testing a software package on a predetermined system architecture under a predetermined version;
    monitoring an execution of the highest priority task;

comparing a result of the highest priority task during the execution against a current predefined outcome;

setting the result of the highest priority task as a new predefined outcome if the result of the highest priority task supersedes the current predefined outcome; and terminating the highest priority task if the highest priority task exceeds an execution limit.

9. The computer-readable medium of claim 8 wherein the task comprises data and instructions to cause the programmable processor to execute the task.

10. The computer-readable medium of claim 8 wherein the task comprises a database identifier, the medium containing additional instructions to cause the programmable processor to perform operations comprising:

retrieving data and instructions associated with the database identifier from a database; and executing the data and instructions.

11. The computer-readable medium of claim 8, containing additional instructions to cause the programmable processor to perform operations comprising:

monitoring the task to collect execution information; and transmitting the execution information to an administrator.

12. The computer-readable medium of claim 8, containing additional instructions to cause the programmable processor to perform operations comprising:

monitoring the task to collect execution information; and storing the execution information in a database, wherein the execution information in the database affects a subsequent task database query operation.

13. The computer-readable medium of claim 8, containing additional instructions to cause the programmable processor to perform operations comprising:

collecting data from the task; and storing a portion of the data.

14. A system comprising:

a database to store information about computing tasks to be performed;

a plurality of computing resources to perform computing tasks, the plurality of computing resources having corresponding hardware characteristics;

a dispatcher to determine if any of the plurality of computing resources are available using worker processes running on the plurality of processing resources to detect when any of the plurality of processing resources is able to execute a task, to determine hardware characteristics of the available processing resources, to query a task database, upon identifying available processing resources, to find tasks eligible to be performed by the available processing resources based on matched hardware characteristics, to select a highest priority task from the found eligible tasks, to dispatch the highest priority task for execution on one of the available processing resources, the highest priority task testing a software package on a predetermined system architecture under a predetermined version, to monitor an execution of the highest priority task, and to terminate the highest priority task if the highest priority task exceeds an execution limit; and a test result evaluator to compare a result of the highest priority task during the execution against a current predefined outcome, and to set the result of the highest priority task as a new predefined outcome if the result of the highest priority task supersedes the current predefined outcome.

15. The system of claim 14, further comprising:

logic to adjust an assignment operation of the dispatcher according to a result of the assigned computing task.

16. The system of claim 14 wherein the computing task is to build a software package on a predetermined system architecture under a predetermined system version.

* * * * *